UNITED STATES PATENT OFFICE.

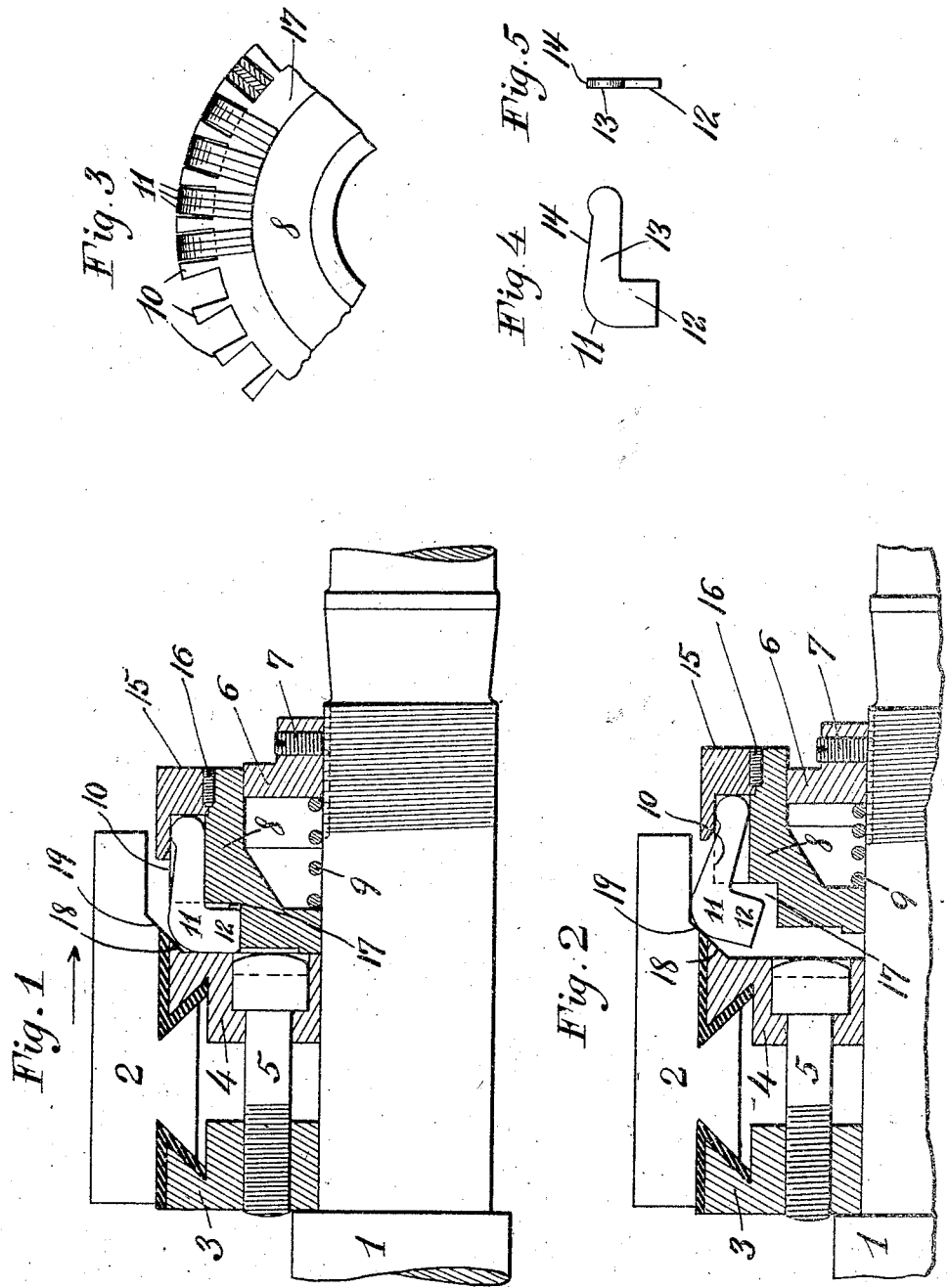

CHARLES STOWE RENO, OF CINCINNATI, OHIO.

COMMUTATOR-SHORT-CIRCUITING DEVICE.

1,007,893.  Specification of Letters Patent.  Patented Nov. 7, 1911.

Application filed November 5, 1909. Serial No. 526,339.

*To all whom it may concern:*

Be it known that I, CHARLES STOWE RENO, a citizen of the United States, residing at Cincinnati, in the county of Hamilton and State of Ohio, have invented certain new and useful Improvements in Commutator-Short-Circuiting Devices, of which the following is a full, clear, and exact specification.

This invention relates to means for electrically connecting together segments of the commutator of a dynamo electric machine.

As is well known to persons skilled in the art, motors operated by single phase alternating currents will not start from rest when connected to operate as induction or synchronous motors. For this reason single phase alternating current motors are frequently supplied with commutators, whereby the motor can be made to operate as a commutator type motor in starting, while when the motor has been brought up to approximate speed the conductors connected with the commutator have their circuits locally closed, or short circuited, by connecting together segments of the commutator, or otherwise, so that the motor may operate as an induction motor.

Various devices have been provided which are adapted to locally close, or short circuit, the windings connected to the commutator when a certain speed has been reached, and it is the general object of the present invention to provide improved apparatus of the character described.

Specific objects of the invention will appear hereinafter.

The invention can be best described in connection with the accompanying drawings which illustrate the invention and of which—

Figure 1 is a view showing in longitudinal section a commutator and the improved connecting means mounted upon an armature or rotor shaft. Inasmuch as the parts are symmetrical about the shaft, but one-half of the commutator structure and connecting means is shown. In this figure the connecting means is shown in position wherein the segments of the commutator are not connected. Fig. 2 is a view like Fig. 1, except that the connecting means is shown in position wherein the segments of the commutator are connected. Fig. 3 is an elevation, looking in the direction of the arrow in Fig. 1, of a segment of the tumbler carriage some of the tumblers being shown in position, and of those shown, some are in end view and others in section, it being understood that the carriage is circular and symmetrical about the shaft. Fig. 4 is a side view of a tumbler, and Fig. 5 is an end view thereof.

Referring to the drawings, upon the armature or rotor shaft 1 is mounted a commutator which comprises conducting contacts or segments and supporting and clamping means therefor. These segments, as 2, are arranged side by side in a well known manner so as to form a cylinder about the shaft 1. The segments are insulated from each other and from the clamping rings 3 and 4, these rings being drawn together by screws or bolts 5, so as to clamp the segments together in a well known manner. It will be understood that upon the shaft 1 is mounted suitable armature winding which may be connected with the commutator segments 2 in any of the ways well known in the art.

Threaded upon the shaft is a collar 6 which may be fixed in position by means of a set screw 7. Bearing upon the shaft 1 and upon the collar 6 is a tumbler carriage 8, and a spring 9 is interposed between this carriage and the collar 6. The periphery of the tumbler carriage is divided into compartments by means of radially projecting walls 10. Within each of the compartments is laid one or more tumblers 11. These tumblers are L-shaped one of the legs 12 being heavier than the other, while the other leg 13 has one end rounded, as shown, so as to turn easily about that end, and is provided with a depression 14 on its outer side. A groove 17 extending circumferentially about the carriage 8 accommodates the legs 12 of the tumblers. A cap 15 overlaps the rounded end of the leg 13, so as to prevent the same from flying outwardly, and this cap is secured to the tumbler carriage by any suitable means, such, for instance, as screws 16, which take partly into the cap 15 and partly into the carriage 8. Preferably the carriage 8 and the cap 15 are made of cast brass, and the tumblers are formed from sheet copper.

When the shaft is at rest, or running at a slow speed, the spring 9 presses the tumbler carriage to the left and the parts will be in the position as shown in Fig. 1. The ring 4 is provided with an inclined surface 18, which is in line with the inclined surfaces 19, upon the commutator segments. When a certain speed has been reached, the leg 12 of the tumblers will fly outwardly under the action of the centrifugal force, the tumblers turning about the rounded ends of the legs 13. The tumblers will first come against the inclined surface 18, and as the centrifugal force increases there will be produced a wedging action which will produce a thrust upon the tumbler carrying means. This thrust acting against the spring 9 will cause the tumbler carriage to be moved to the right, and as this action continues the ends of the tumblers will travel along the incline formed by the surfaces 18 and 19, thereby forming a wiping contact, until they reach the position as shown in Fig. 2, when they will be in contact with the commutator segments and those segments will be electrically connected together, or short circuited, through the tumblers and the tumbler-carrying means. As the speed, and therefore the centrifugal force, decreases, the spring 9 will force the tumbler carriage to the left, and the tumblers traveling in the opposite direction along the inclined surfaces 18 and 19 will pass out of contact with the commutator segments, and assume the position as shown in Fig. 1.

Inasmuch as the tumblers are loosely placed in their carrying means they are free to respond promptly to the forces acting, and it is an important feature that the tumblers are divided into groups separated by walls on the carriage, as otherwise looseness and freedom of operation of the tumblers could not be obtained without danger of their falling over and piling up on each other.

The depressions 14 in the tops of the tumblers prevent the restriction of movement by coming in contact with the edge of the cap 15, and the edge of this cap may be beveled, as shown, for the same purpose.

The pressure of the spring 9 and the friction of the parts will ordinarily be found sufficient to cause the tumblers and carrier to rotate with the shaft while permitting axial movement thereof, but if this is found insufficient any suitable means for preventing circumferential and permitting axial movement of the carrier, such as a splining key, may be employed.

While I have illustrated the invention in what is considered its best application, it may be embodied in other structures without departing from the spirit thereof. The invention, therefore, is not limited to the structure shown in the drawings.

Having thus described my invention, I declare that what I claim as new and desire to secure by Letters Patent, is—

1. In a dynamo electric machine, the combination with a rotatable shaft, of a commutator thereon having an inclined face, a tumbler-carrying means slidable along said shaft but turning therewith, said means comprising a carriage having peripheral compartments and a cap extending over said compartments, one or more loosely lying tumblers extending within each of said compartments and beneath said cap, each of said tumblers being adapted to turn about its end and to engage said inclined face so as to force said tumbler-carrying means along said shaft as said tumblers move outwardly, and a spring tending to move said carriage in the opposite direction along said shaft.

2. The combination with a shaft, of contacts arranged about said shaft, a tumbler-carrying means rotating with said shaft, tumblers carried by said means and adapted to fly outwardly under centrifugal force and engage with said contacts, said means having parts extending between the tumblers and supporting said tumblers in radial position, and means tending to hold said tumblers out of engagement with said contacts.

3. The combination with a shaft, of contacts arranged about said shaft, a tumbler-carrying means rotating with said shaft but slidable longitudinally thereon, tumblers pivoted in said means and adapted to move outwardly to contact with said contacts, said tumbler-carrying means being moved along said shaft as said tumblers move outwardly, and means for opposing such motion of said tumbler-carrying means.

4. In a dynamo electric machine, the combination with a rotatable shaft, of a commutator thereon, tumblers, a tumbler-carrying means mounted upon said shaft and turning therewith, said means comprising a carriage having peripheral compartments and means for confining an end of each tumbler each tumbler being adapted to turn about its end, one or more tumblers extending within each of said compartments, said tumblers being adapted when turned about their ends to engage the segments of said commutator, and means tending to hold said tumblers out of contact with said segments.

5. In a dynamo electric machine, the combination with a rotatable shaft, of a commutator mounted thereon and turning therewith, tumblers, a tumbler-carrying means having peripheral compartments and means for confining an end of each tumbler each tumbler being adapted to turn about its end, one or more L-shaped tumblers extending within each of said compartments, said tumblers being adapted to move outwardly to engage the segments of said commutator, and means for normally holding said tumblers out of engagement with said segments.

6. The combination with a rotatable shaft, of contacts arranged about said shaft, a plurality of tumblers arranged about said shaft, said tumblers having radial and horizontal legs, and being pivoted at the ends of their horizontal legs, the radial legs being adapted to fly outwardly under the action of centrifugal force to engage said contacts, and means tending to hold said tumblers out of engagement with said contacts, said means comprising a part bearing upon said tumblers, to actuate the same, at the pivoted ends of their horizontal legs.

7. In a dynamo electric machine, the combination with a rotatable shaft, of a commutator structure thereon having an inclined surface, a plurality of tumblers arranged about said shaft, a tumbler carriage slidable along said shaft, said tumblers having radial and horizontal legs and being pivoted at the ends of their horizontal legs to said carriage, the radial legs being adapted to fly outwardly under the action of centrifugal force to engage said contacts, said tumblers in such outward movement engaging said inclined surface and forcing said carriage along said shaft, and means tending to force said carriage along said shaft in the opposite direction.

8. The combination with a shaft of contacts arranged about said shaft, tumblers arranged about said shaft and adapted to fly outwardly under centrifugal force to engage said contacts, radial supporting partitions extending between said tumblers, and means tending to hold the said tumblers out of engagement with said contacts.

In testimony whereof I affix my signature in presence of two witnesses.

CHARLES STOWE RENO.

Witnesses:
L. K. SAGER,
THOMAS HOWE.